United States Patent
Harrison

[11] Patent Number: 6,067,324
[45] Date of Patent: May 23, 2000

[54] METHOD AND SYSTEM FOR TRANSMITTING AND DEMODULATING A COMMUNICATIONS SIGNAL USING AN ADAPTIVE ANTENNA ARRAY IN A WIRELESS COMMUNICATION SYSTEM

[75] Inventor: Robert Mark Harrison, Grapevine, Tex.

[73] Assignee: Motorola, Inc., Schaumburg, Ill.

[21] Appl. No.: 09/107,106

[22] Filed: Jun. 30, 1998

[51] Int. Cl.[7] .............................. H04B 7/02; H04B 1/38
[52] U.S. Cl. ........................................... 375/267; 375/219
[58] Field of Search ................................... 375/267, 295, 375/347, 200, 316, 358, 365, 219; 370/522, 334, 335, 342; 455/500, 522, 517, 524, 101, 73, 562, 132

[56] References Cited

U.S. PATENT DOCUMENTS

| | | | |
|---|---|---|---|
| 5,280,472 | 1/1994 | Gilhousen et al. | 370/335 |
| 5,737,327 | 4/1998 | Ling et al. | 370/335 |
| 5,809,020 | 9/1998 | Bruckert et al. | 370/335 |
| 5,812,542 | 9/1998 | Bruckert et al. | 370/335 |
| 5,835,847 | 11/1998 | Gilmore et al. | 455/12.1 |

*Primary Examiner*—Tesfaldet Bocure
*Attorney, Agent, or Firm*—L. Bruce Terry

[57] ABSTRACT

In a transceiver for transmitting a communication signal from an antenna array in a wireless communications system, a different element pilot is transmitted from a plurality of antenna elements in an antenna array. Thereafter, transmitter control data based upon measured characteristics of the element pilots as measured at a subscriber unit is received at the transceiver. In response to the transmitter control data, a plurality of adaptive array weights for modifying a plurality of element communication signals are determined. Next, the transceiver determines that the subscriber unit is ready to receive a communication signal transmitted from the antenna array and weighted according to the plurality of adaptive array weights. In response to determining that the subscriber unit is ready, the transceiver modifies the plurality of element communication signals according to the determined plurality of adaptive array weights.

26 Claims, 5 Drawing Sheets

…

METHOD AND SYSTEM FOR TRANSMITTING AND DEMODULATING A COMMUNICATIONS SIGNAL USING AN ADAPTIVE ANTENNA ARRAY IN A WIRELESS COMMUNICATION SYSTEM

FIELD OF THE INVENTION

The present invention is related in general to wireless communications systems, and more particularly to an improved method and system for transmitting and demodulating a communications signal using an adaptive antenna array in a wireless communication system.

BACKGROUND OF THE INVENTION

A frequent goal in designing wireless communications systems is to increase the number of users that may be simultaneously served by the communications system. This may be referred to as increasing system capacity.

In code division multiple access (CDMA) wireless communications systems, the use of adaptive antenna arrays at the base transceiver has been proposed as a method of increasing system capacity. An adaptive array antenna includes two or more radiating elements with dimensions, spacing, orientation, and an illumination sequences such that the fields for the individual elements combine to produce a field having greater intensities in some directions and lesser field intensities in other directions. An adaptive array antenna helps increase system capacity because this field pattern or radiation pattern (which includes a plurality of beams or lobes) may be configured such that signals intended for a selected user are in higher-gain antenna lobes are pointed in the direction of a propagation path to a selected user, while nulls in the antenna pattern are likely to be directed to other users. Thus, other signals intended for the other users in the selected user's antenna null are not adversely affected by the power intended for the selected user. This increases capacity because one user's signals are not transmitted with a higher antenna gain to all the other users in the sector or cell where it would degrade all other users' signals. While some other users may be in a higher gain lobe, others are not, which makes all users statistically better able to receive their intended signals.

In prior art proposals for adaptive array transmitters that adjust their patterns on a per user basis, a per user pilot is typically used. This is because proper demodulation requires that the pilot be in phase with the traffic channel. Thus, if the pilot is not transmitted with the same antenna pattern as the traffic channel, then the pilot phase will be shifted relative to the traffic channel. In an adaptive array system having a pilot for each user, each user's pilot must be modified in accordance with the weights (i.e., the gains and phases) used for creating the user's traffic channel illumination sequence.

This the per user pilot system has diminished capacity due to: (1) the use of additional pilots; (2) the use of longer pilot sequences to distinguish each pilot; (3) a corresponding increase in complexity of the pilot searcher in the subscriber unit due to the longer pilot sequences; (4) the lack of backward compatibility with existing, CDMA cellular (IS-95) subscriber units; and (5) the increase in soft handoff complexity, and reduction in capacity due to the assignment of an additional pilot per user during soft handoff.

Adding a per-user pilot effectively reduces the amount of gain obtained by using an adaptive array. If we assume that a broadcast pilot takes up 7% of the total transmit power, and that per-user pilots use the same 7% of total transmitted power, 7% capacity is lost because broadcast pilots are still required for handoff purposes.

Because of the increase in sector capacity provided by adaptive arrays, four times as many pilots may be required. This means that the pilot sequences must be four times longer in order to distinguish the pilots. A searcher in a subscriber that searches for these longer pilots would require four times as much integration time, which means higher computational requirements. This is compounded by the fact that the narrow beams of the adaptive arrays generally mean more searching has to be done since there are more beams. This means that the searchers are likely to be overloaded.

Thus, it should be apparent that a need exist for a method and system of transmitting and demodulating a communications signal with an adaptive antenna array without the need for per-user pilots or high-capacity, complex signaling between the base transceiver and the subscriber unit.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
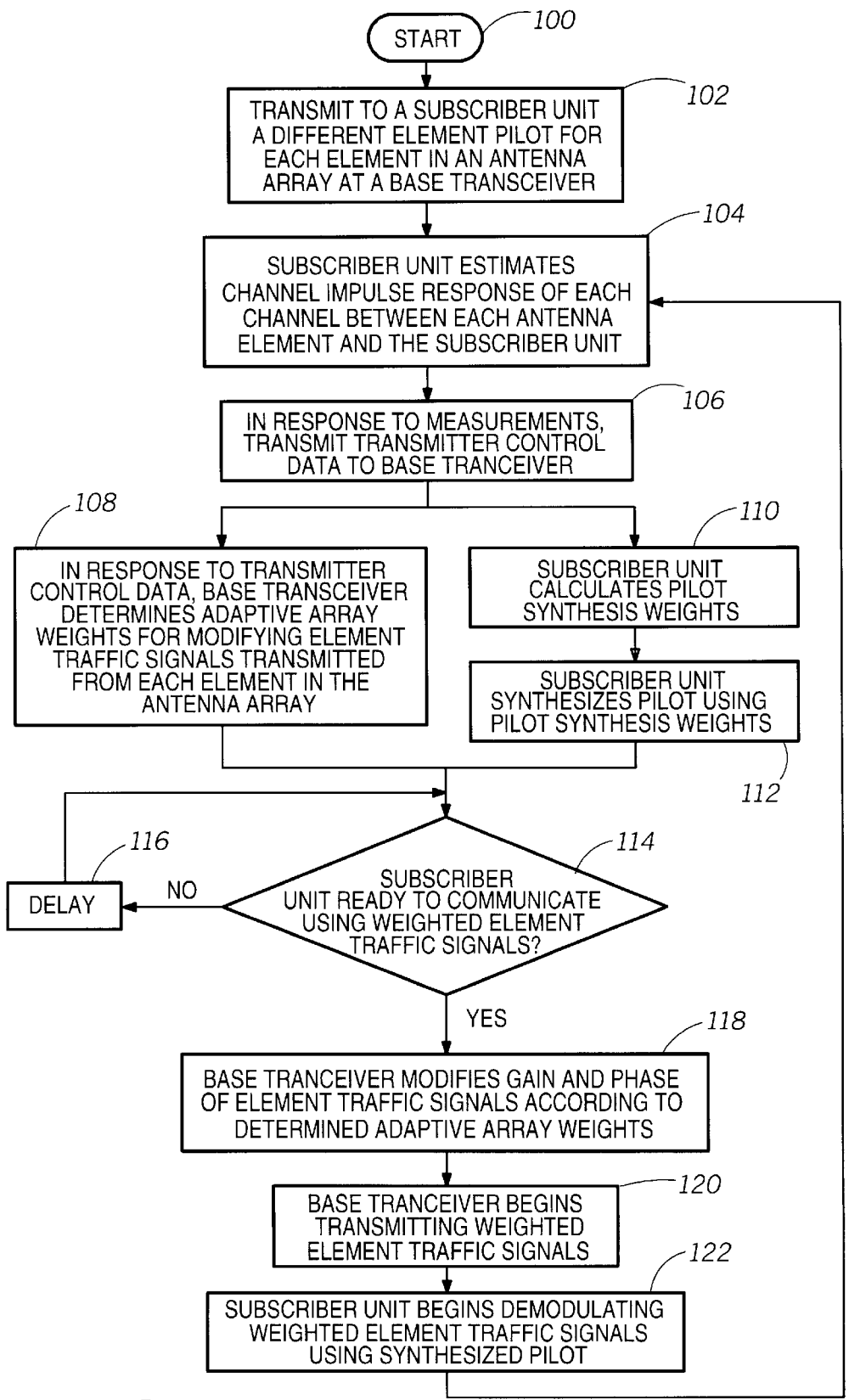
FIG. 1 is a high-level logic flowchart which illustrates the method and operation of the present invention.

With reference now to the figures, and in particular with reference to FIG. 1, there is depicted a logic flowchart that illustrates the operation of the method and system of the present invention. As illustrated, the process begins at block 100 and thereafter passes to block 102, wherein the system transmits to a subscriber unit a different element pilot for each element in an adaptive antenna array at a base transceiver. A pilot is a signal transmitted from a base transceiver to a subscriber unit for the purpose of providing a reference to the subscriber unit so that the subscriber unit can characterize the radio frequency (RF) channel. The pilot may also provide a phase reference for coherent demodulation. In a CDMA system the pilot may be implemented with a direct-sequence spread spectrum signal.

The element pilots are constructed to have low cross correlation. They are preferably constructed from orthogonal sequences, such as the Walsh-Hadamard sequences used in IS-95 (see TIA/EIA/IS-95-A, *Mobile Station-Base Station Capability Standard for Dual Mode Wide Band Spread Spectrum Cellular System*, March 1995, published by the Electronic Industries Association (EIA), 2001 I Street, N.W., Washington, D.C. 20006), but can be formed from low cross correlation sequences, such as different offsets of a pseudonoise (PN) sequence.

Next, the subscriber unit estimates the channel impulse response of each channel that extends from each antenna element to the subscriber unit, as illustrated at block 104.

Note that the impulse response of each of these channels may include several rays, each propagating over different paths between the antenna element and the subscriber unit. Each channel impulse response may be estimated by using a matched filter that is matched to each element pilot. These matched filters have impulse responses that are the time reversed complex conjugate of the element pilots. The matched filter lengths are set long, enough to average out noise, but short enough so the filter is responsive to changes in the channel.

After estimating the channel impulse response, the subscriber unit transmits transmitter control data to the base transceiver, as depicted at block 106. The transmitter control data provides the base transceiver information necessary to modify the traffic channel signals in a way that enhances the gain of the antenna array for the particular location of the subscriber unit. In a preferred embodiment, the transmitter control data are the adaptive array weights that the subscriber unit recommends for the phase and gain modifications for each of the antenna elements at the transceiver. In an alternate embodiment, the transmitter control data are the quantized channel impulse response measurements of each channel between each antenna element and the subscriber unit. In yet another embodiment, the transmitter control data may be an error rate indication which provides feedback to the base transceiver regarding the effectiveness of a recent selection of weights.

Following the transmission of transmitter control data, the process performs various steps at the base transceiver and at the subscriber unit, as shown by parallel paths in the flowchart. In the base transceiver, the process uses the transmitter control data to determine adaptive array weights for modifying the element traffic signals that are transmitted from each element in the antenna array, as illustrated at block 108. In a preferred embodiment, the base transceiver uses the transmit adaptive array weights recommended by the subscriber unit for driving each element in the antenna array. Alternatively, these adaptive array weights may be calculated in a manner similar to that described below with reference to the calculation of pilot synthesis weights used in synthesizing a pilot in the subscriber unit.

Referring now to operations in the subscriber unit, a set of pilot synthesis weights are computed based upon the estimated impulse response of the channels between each antenna element and the subscriber unit. In a preferred embodiment, these pilot synthesis weights are computed to deliver the maximum power to the subscriber. When one adaptive array weight is used per element, the pilot synthesis weights which deliver maximum power are the elements of the eigenvector corresponding to the maximum eigenvalue of the channel impulse response sample autocorrelation matrix, $R_A$, which is defined below:

$$W_i = e(i);$$

$$R_A e_{\max} = \lambda_{\max} e_{\max}$$

$$R_A \equiv A^H A;$$

$$A \equiv \begin{bmatrix} \alpha_1(1) & \alpha_2(1) & \cdots & \alpha_n(1) \\ \alpha_1(2) & \alpha_2(2) & \cdots & \alpha_n(2) \\ \vdots & \vdots & \ddots & \vdots \\ \alpha_1(M) & \alpha_2(M) & \cdots & \alpha_n(M) \end{bmatrix}$$

where $W_i$ is the weight on the ith antenna, $\alpha_i(j)$ is the value of the estimated channel impulse response of the channel from the ith antenna element to the subscriber at delay j, $\lambda_{max}$ is the maximum eigenvalue, and $e_{max}$ is the eigenvector corresponding to the maximum eigenvalue.

When multiple weights are used per element, the adaptive array weights may be the complex conjugate of the normalized channel impulse response estimates. In this case, the vector of weights at element i may be written:

$$W_i = \frac{[\alpha_i^*(1) \quad \alpha_i^*(2) \quad \cdots \quad \alpha_i^*(n)]}{\left(\sum_{k=1}^{N} |\alpha_i(k)|^2\right)^{1/2}}$$

where "*" indicates the complex conjugate.

According to an important aspect of the present invention, the method of calculating adaptive array weights at the base transceiver for modifying element traffic signals is mathematically related to, or coordinated with, the method the subscriber unit uses to calculate pilot synthesis weights.

After calculating pilot synthesis weights, the process synthesizes a pilot using the pilot synthesis weights, as illustrated at block 112. This "synthesized pilot" is created by summing weighted versions of estimated channel impulse responses. Thus, the synthesized pilot describes the gain and phase of the "composite" channel, which comprises all paths of all rays between all antenna elements and the subscriber unit. Because the synthesized pilot contains information that more completely describes the composite channel, the synthesized pilot is a good reference for coherently demodulating the traffic channel received at the subscriber unit.

According to the present invention, the timing or synchronization of the use of weights in transmitting and demodulating must be carefully coordinated between the base transceiver and the subscriber unit. If, for example, the transceiver changes adaptive array weights for modifying element traffic signals before the subscriber unit calculates pilot synthesis weights and synthesizes a pilot, the weights could be substantially different, and errors will most likely result at the subscriber unit. Thus, as depicted at block 114, the process includes a step of determining that the subscriber unit is ready to receive the weighted element traffic signals that have been weighted with newly calculated adaptive array weights. If the subscriber unit is not ready, the process delays, as illustrated at block 116. Note that the embodiment shown in FIG. 1 assumes the base for a slow subscriber unit. In alternative embodiments of the present invention, this step of synchronizing the transition to new weights may require that the subscriber unit wait for the base transceiver. In any event, the slower unit may notify the faster unit that it is ready to use newly calculated weights, or the two units can agree to delay before the transition for a predetermined period of time that exceeds the time needed to calculate weights in either unit, Thus, the determining readiness step includes a message to indicate readiness, or a delay for a period needed to synchronize the transition.

After synchronizing the transition to newly calculated weights, the base transceiver modifies the gain and phase of each element traffic signal according to the determined adaptive arrays weights for modifying element traffic signals, as illustrated at block 118. Next, the base transceiver begins transmitting the weighted element traffic signals, as depicted at block 120. At a coordinated time, the subscriber unit next begins demodulating the weighted element traffic signals using the synthesized pilot, as illustrated at block 122. Thereafter, the process iteratively returns to block 104, wherein the channel impulse response measurements are updated, adaptive array and pilot synthesis weights are recalculated, and a transition to the newly calculated weights is synchronized as described above.

Figure 2:
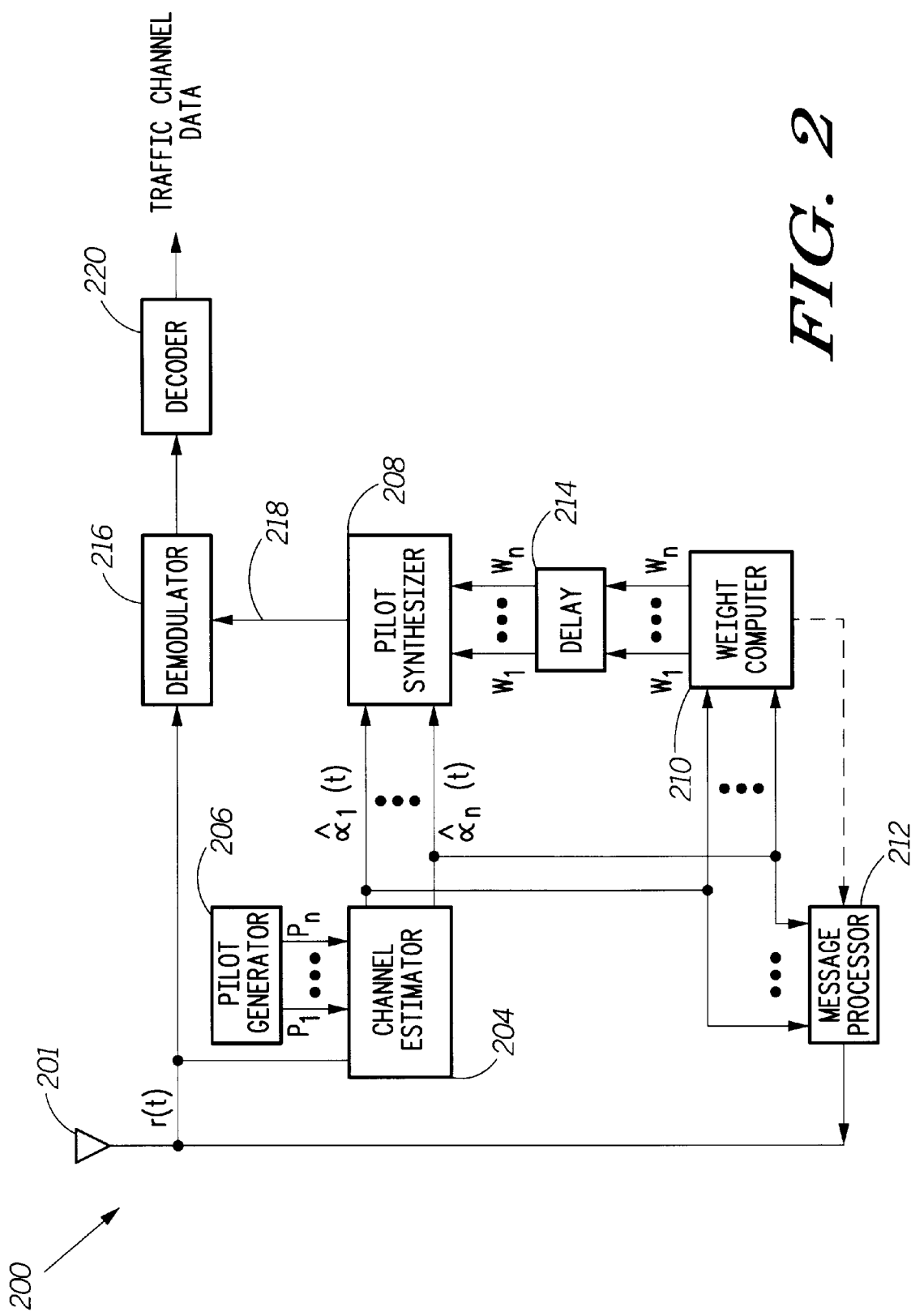
FIG. 2 depicts a subscriber unit for implementing the method and system of the present invention.

With reference now to FIG. 2, there is depicted a subscriber unit for implementing the method and system of the present invention. As illustrated, subscriber unit 200 includes antenna 201 for receiving and transmitting signals to and from a base transceiver.

Antenna 201 is coupled to channel estimator 204, which is used to estimate a channel impulse response for each channel between each antenna element at the transceiver base station and antenna 201. Inputs to channel estimator 204 are coupled to pilot generator 206, which generates pilot signals $P_1-P_n$ that correspond to element pilots used on each antenna element of the antenna array at the base transceiver.

The output of channel estimator 204 is a group of vectors, $\hat{\alpha}_i(t)-\hat{\alpha}_n(t)$, that describe the impulse response of channels between each antenna element and subscriber antenna 201. These vectors are coupled to inputs at pilot synthesizer 208, weight computer 210, and message processor 212.

Message processor 212 sends to the base transceiver transmitter control data that is used to determine the adaptive array weights. This transmitter control data may include recommended adaptive array weights that were calculated in the subscriber unit. Alternatively, the transmitter control data may be a representation of the channel impulse response measurements from channel estimator 204. These representations may be quantized representations of the channel impulse response vectors. In yet another embodiment, the transmitter control data may be a message indicating a channel error rate, which may be used to indicate the effectiveness of the sets of adaptive array and pilot synthesis weights selected at the base transceiver and the subscriber unit, respectively.

Weight computer 210 receives as inputs the channel impulse response vectors and calculates the weights that the subscriber unit uses to synthesize a pilot. In a preferred embodiment, weight computer 210 may also compute recommended adaptive array weights and send the recommended weights to message processor 212, which in turn transmits the recommended weights to the base transceiver so the transceiver can use these in transmitting element traffic signals.

The pilot synthesis weights output by weight computer 210 may be delayed by delay circuit 214 before being transferred to pilot synthesizer 208. The purpose of this delay is to synchronize the transition from the previous set of weights to the newly calculated set of weights at both the subscriber unit and the base transceiver. In some embodiments, the duration of delay 214 may be zero because the base transceiver is waiting for subscriber unit 200 to calculate pilot synthesis weights in weight computer 210.

Following, the synchronization delay, the calculated pilot synthesis weights are input into pilot synthesizer 208 wherein a pilot is synthesized and used in demodulator 216 to demodulate traffic signals. Within demodulator 216, synthesized pilot 218 is used as a reference for coherent demodulation. Demodulator 216 may be implemented with a RAKE receiver, in which case the output of demodulator 216 is a despread baseband combination of RAKER fingers.

The output of demodulator 216 is coupled to decoder 220, which may be implemented with a Viterbi decoder. The output of decoder 220 is traffic channel data, which may represent voice or user data and be passed on to the subscriber unit user in an appropriate manner.

Figure 3:
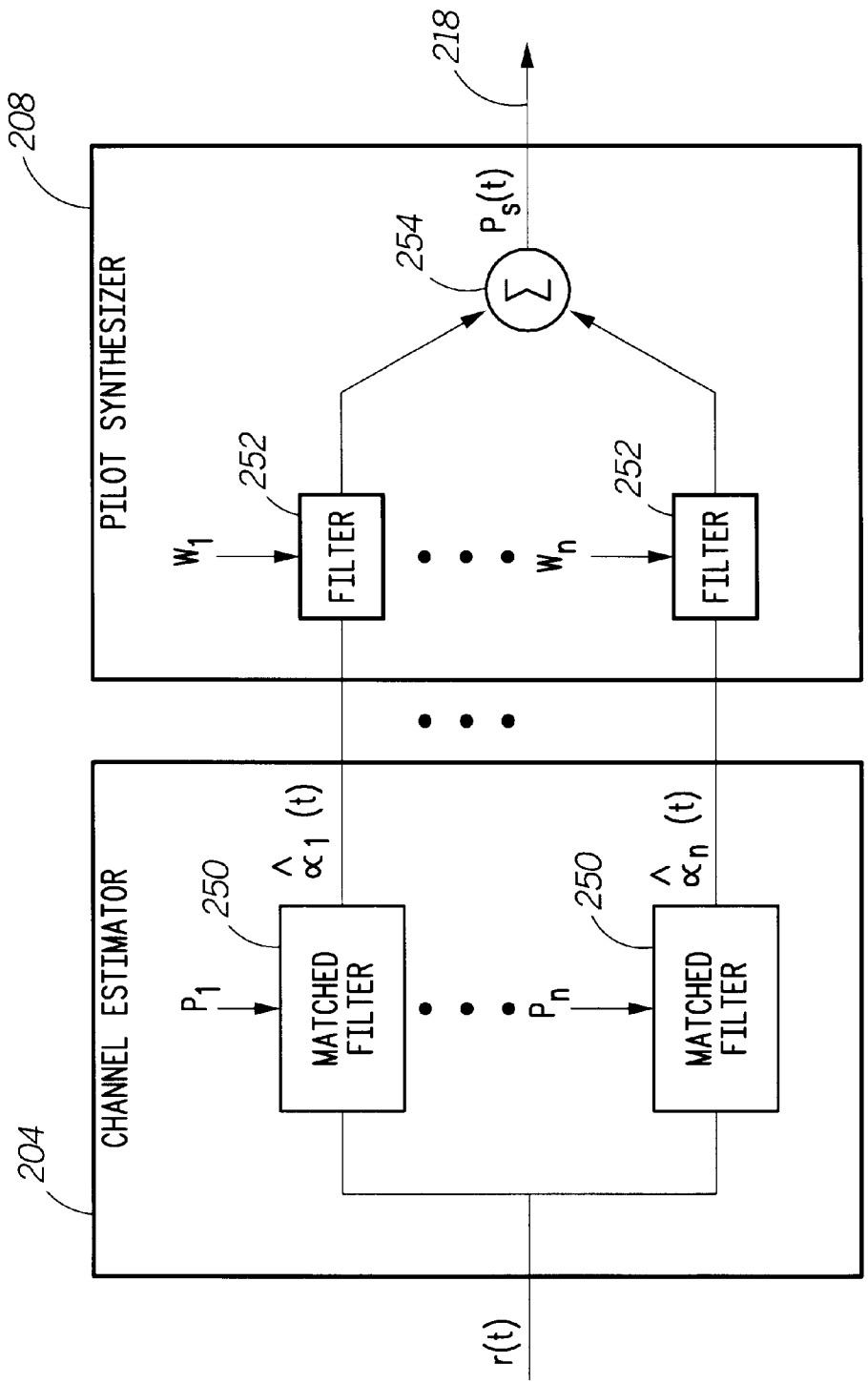
FIG. 3 depicts a more detailed diagram of a channel estimator and a pilot synthesizer, which are shown in FIG. 2.

With reference now to FIG. 3, there is depicted a more detailed diagram of a channel estimator and a pilot synthesizer, as shown in FIG. 2. The input to channel estimator 204 is the baseband signal r(t) from antenna 201. (Note that a downconverter from RF is not shown) Within channel estimator 204 the baseband signal r(t) is coupled to matched filters 250. These matched filters also have inputs from pilot generator 206, shown in FIG. 3 as pilots $P_1-P_n$.

Matched filters 250 perform a matched filter operation using the baseband received signal r(t) and the pilots $P_1-P_n$, as described above. The output of each matched filter 250 is the channel impulse response estimate of the channel from each antenna element to the subscriber unit.

These channel impulse response estimates are then coupled to pilot synthesizer 208. Pilot synthesizer 208 includes filters 252 which filter the channel impulse response estimates with the pilot synthesis weights $W_1-W_n$. Filters 252 may be implemented with a single tap filter, in which case the impulse response estimates are each multiplied by pilot synthesis weights $W_1-W_n$.

The output of filters 252 are coupled to summer 254 which adds all the outputs. The output of summer 254 is synthesized pilot 218, which is an impulse response vector equivalent to a single pilot transmitted with the adaptive array using weights $W_1-W_n$.

Figure 4:
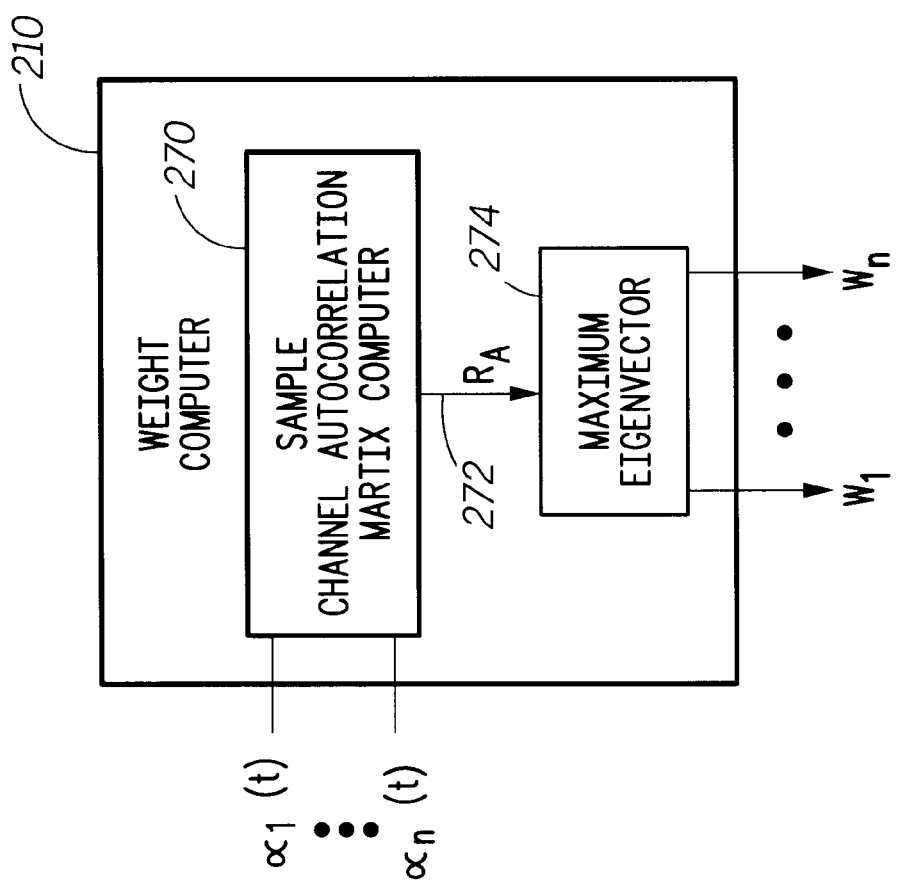
FIG. 4 is a more detailed illustration of a weight computer, which is shown in FIG. 2.

With reference now to FIG. 4, there is depicted a more detailed illustration of weight computer 210, which is shown in FIG. 2. As illustrated, weight computer 210 includes sample channel autocorrelation matrix computer 270. Matrix computer 270 receives channel impulse response estimates from channel estimator 204 and computes the sample channel autocorrelation matrix, $R_A$ 272, as described above.

Matrix $R_A$ 272 is then input into maximum eigenvector calculator 274 which computes the eigenvector corresponding to the maximum eigenvalue of sample channel autocorrelation matrix, $R_A$ 272. The output of maximum eigenvector calculator 274 are the elements of the maximum eigenvector, shown here as $W_1-W_n$, the pilot synthesis weights.

Figure 5:
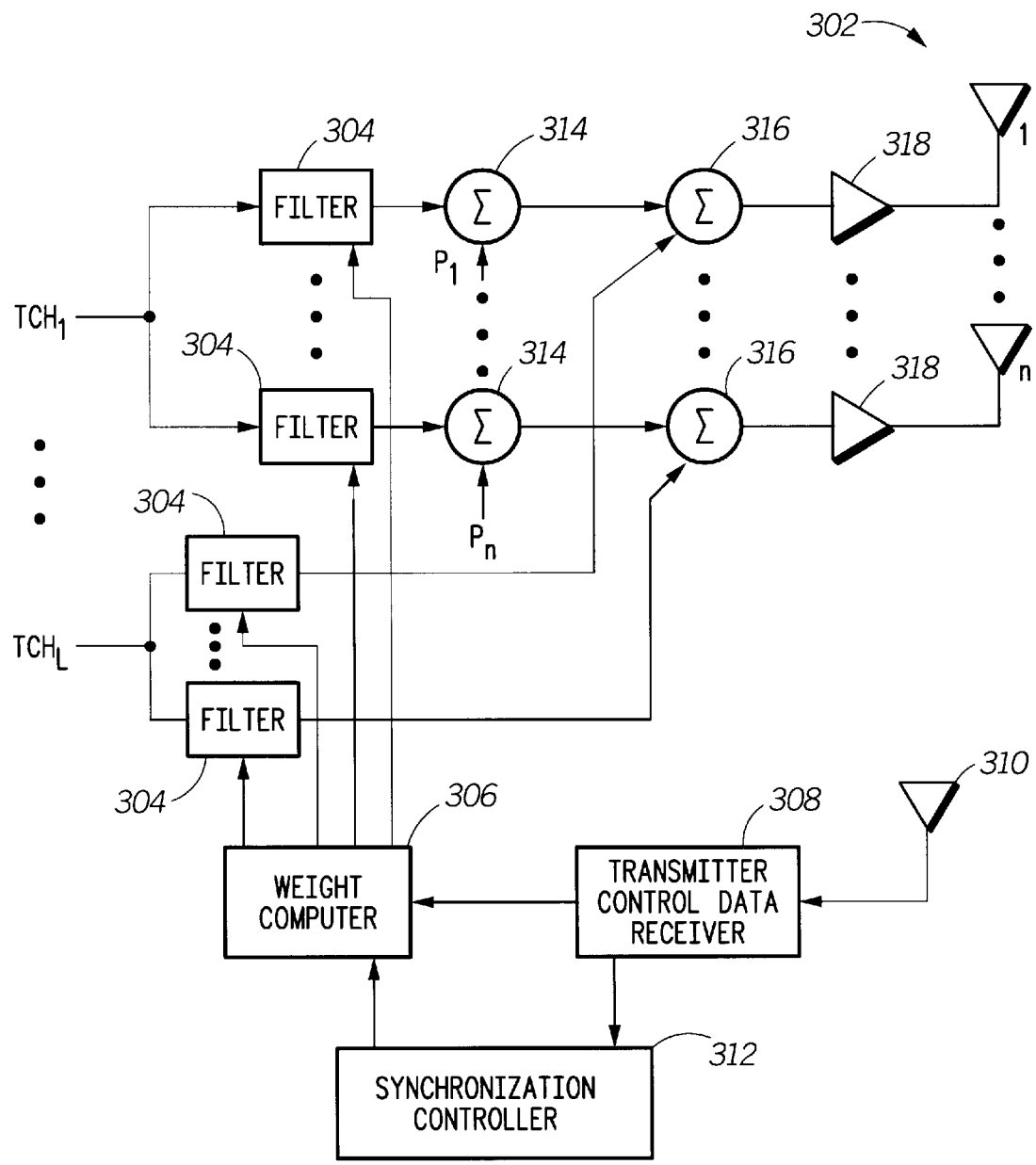
FIG. 5 depicts a base transceiver in accordance with the method and system of the present invention.

With reference now to FIG. 5, there is depicted a base transceiver in accordance with the method and system of the present invention. As illustrated, base transceiver 300 includes traffic channel data, shown $TCH_1-TCH_L$, for one or more users. Each traffic channel is split n-ways to provide a source of traffic channel data for each element in n-element antenna array 302.

After splitting the signal n-ways, each of the n signals is input into filters 304, which are used to create the weighted element traffic signals for each element of antenna array 302. Filters 304 receive adaptive array weights from weight computer 306.

Adaptive array weights output by weight computer 306 are determined based upon transmitter control data received by transmitter control data receiver 308. Transmitter control data receiver 308 receives an input from antenna 310, which may or may not be an element in antenna array 302. In a preferred embodiment, transmitter control data receiver 308 receives recommended adaptive array weights from subscriber unit 200. Weight computer 306 then uses the recommended adaptive array weights to control filters 304.

In an alternative embodiment, transmitter control data receiver 308 may receive quantized channel impulse response estimates from subscriber 200, which are then passed to weight computer 306 for calculating adaptive array weights in a manner similar to the calculation of pilot synthesis weights in subscriber unit 200, as discussed with reference to FIGS. 4 and 5.

Synchronization controller 312 determines whether or not the subscriber unit is ready to receive element traffic signals modified with the newly determined adaptive array weights.

When the subscriber unit is ready, synchronization controller 312 initiates a change to the newly calculated adaptive array weights in weight computer 306. Thus, new adaptive array weights are used in filters 304 at a time determined by synchronization controller 312.

After element traffic signals have been weighted by filters 304, element pilots $P_1-P_n$ are added to the weighted traffic element signals by summers 314. Pilots $P_1-P_n$ correspond to antenna elements 1–n in antenna array 302. At subscriber unit 200, the channels for antenna elements 1–n are uniquely characterized by the ability to distinguish pilots $P_1-P_n$ from one another.

Following summers 314, summers 316 add L weighted element traffic signals from the other L traffic channels to form the n signals that will be transmitted over each element in antenna array 302.

Coupled to the outputs of summers 316 are upconverters 318 which may be used to convert the signals output by summers 316 to radio frequency signals suitable for transmission.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a transceiver for transmitting a communication signal from an antenna array in a wireless communications system, the method comprising the steps of:

transmitting a different element pilot from a plurality of antenna elements in an antenna array;

receiving transmitter control data based upon measured characteristics of the element pilots as measured at a subscriber unit;

in response to the transmitter control data, determining a plurality of adaptive array weights for modifying a plurality of element communication signals;

determining that the subscriber unit is ready to receive a communication signal transmitted from the antenna array and weighted according to the plurality of adaptive array weights; and in response to determining that the subscriber unit is ready, modifying the plurality of element communication signals according to the determined plurality of adaptive array weights.

2. The method for transmitting a communication signal from an antenna array according to claim 1 wherein the transmitter control data includes recommended adaptive array weights for modifying the plurality of element communication signals, and wherein the step of determining a plurality of adaptive array weights further includes selecting the recommended adaptive array weights as the plurality of adaptive array weights for modifying a plurality of element communication signals.

3. The method for transmitting a communication signal from an antenna array according to claim 2 wherein the step of determining a plurality of adaptive array weights includes calculating an estimated channel impulse response based upon the transmitter control data.

4. The method for transmitting a communication signal from an antenna array according to claim 1 wherein the transmitter control data includes phases of the different element pilots.

5. The method for transmitting a communication signal from an antenna array according to claim 1 wherein the step of determining that the subscriber unit is ready includes delaying for a period sufficient for the subscriber unit to become ready to receive a communication signal transmitted from the antenna array and weighted according to the plurality of adaptive array weights.

6. The method for transmitting a communication signal from an antenna array according to claim 1 wherein the step of modifying the plurality of element communication signals according to the determined plurality of adaptive array weights includes modifying the phase and gain of the plurality of element communication signals according to the determined plurality of adaptive array weights.

7. The method for transmitting a communication signal from an antenna array according to claim 6 wherein the step of modifying the phase and gain of the plurality of element communication signals according to the determined plurality of adaptive array weights includes filtering the plurality of element communication signals according to the determined plurality of adaptive array weights.

8. A transceiver for transmitting a communication signal from an antenna array in a wireless communications system comprising:

means for transmitting a different element pilot from a plurality of antenna elements in an array;

means for receiving transmitter control data based upon measured characteristics of the element pilots as measured at a subscriber unit;

means for determining a plurality of adaptive array weights for modifying a plurality of element communication signals in response to the transmitter control data;

means for determining that the subscriber unit is ready to receive a communication signal transmitted from the antenna array and weighted according to the plurality of adaptive array weights; and means for modifying the plurality of element communication signals according to the determined plurality of adaptive array weights in response to determining that the subscriber unit is ready.

9. The transceiver for transmitting a communication signal from an antenna array according to claim 8 wherein the transmitter control data includes recommended adaptive array weights for modifying the plurality of element communication signals, and wherein the means for determining a plurality of adaptive array weights further includes means for selecting the recommended adaptive array weights as the plurality of adaptive array weights for modifying a plurality of element communication signals.

10. The transceiver for transmitting a communication signal from an antenna array according to claim 9 wherein the means for determining a plurality of adaptive array weights includes means for calculating an estimate channel impulse response based upon the transmitter control data.

11. The transceiver for transmitting a communication signal from an antenna array according to claim 8 wherein the transmitter control data includes phases of the different element pilots.

12. The transceiver for transmitting a communication signal from an antenna array according to claim 8 wherein the means for determining that the subscriber unit is ready includes means for delaying for a period sufficient for the subscriber unit to become ready to receive a communication signal transmitted from the antenna array and weighted according to the plurality of adaptive array weights.

13. The transceiver for transmitting a communication signal from an antenna array according to claim 8 wherein the means for modifying the plurality of element communication signals according to the determined plurality of adaptive array weights includes means for modifying the phase and gain of the plurality of element communication signals according to the determined plurality of adaptive array weights.

14. The transceiver for transmitting a communication signal from an antenna array according to claim 13 wherein the means for modifying the phase and gain of the plurality of element communication signals according to the determined plurality of adaptive array weights includes means for filtering the plurality of element communication signals according to the determined plurality of adaptive array weights.

15. A method in a subscriber unit for receiving a communication signal from an antenna array in a wireless communications system, the method comprising the steps of:

measuring characteristics of a plurality of different element pilots at the subscriber unit, wherein each different element pilot is transmitted from one of a plurality of antenna elements in an antenna array coupled to a transceiver;

transmitting to the transceiver transmitter control data based upon measured characteristics of the plurality of different element pilots;

calculating pilot synthesis weights;

combining the measured characteristics of the plurality of different element pilots using the pilot synthesis weights to produce a synthesized pilot; and demodulating the communication signal using the synthesized pilot.

16. The method in a subscriber unit for receiving a communication signal from an antenna array according to claim 15 wherein the communication signal comprises element communication signals that are each transmitted from one of the plurality of elements in the antenna array, and wherein the pilot synthesis weights are related to adaptive array weights used at the transceiver to modify characteristics of the element communication signals in response to the transmitter control data.

17. The method in a subscriber unit for receiving a communication signal from an antenna array according to claim 15 wherein the step of measuring characteristics of a plurality of different element pilots includes measuring a phase of a plurality of different element pilots.

18. The method in a subscriber unit for receiving a communication signal from an antenna array according to claim 15 wherein the step of measuring characteristics of a plurality of different element pilots includes estimating a channel impulse response of a channel between an antenna element and the subscriber unit.

19. The method in a subscriber unit for receiving a communication signal from an antenna array according to claim 15 further including the steps of:

calculating recommended adaptive array weights for modifying the plurality of element communication signals; and wherein the step of transmitting to the transceiver transmitter control data includes transmitting to the transceiver recommended adaptive array weights for modifying the plurality of element communication signals.

20. The method in a subscriber unit for receiving a communication signal from an antenna array according to claim 15 wherein the step of combining the measured characteristics of the plurality of different element pilots using the pilot synthesis weights to produce a synthesized pilot includes:

filtering the measured characteristics of the plurality of different element pilots with the pilot synthesis weights to produce filtered results; and adding the filtered results to produce the synthesized pilot.

21. A subscriber unit for receiving a communication signal from an antenna array in a wireless communications system comprising:

means for measuring characteristics of a plurality of different element pilots at the subscriber unit, wherein each different element pilot is transmitted from one of a plurality of antenna elements in an antenna array coupled to a transceiver;

means for transmitting to the transceiver transmitter control data based upon measured characteristics of the plurality of different element pilots;

means for calculating pilot synthesis weights;

means for combining the measured characteristics of the plurality of different element pilots using the pilot synthesis weights to produce a synthesized pilot; and means for demodulating the communication signal using the synthesized pilot.

22. The subscriber unit for receiving a communication signal from an antenna array according to claim 21 wherein the communication signal comprises element communication signals that are each transmitted from one of the plurality of elements in the antenna array, and wherein the pilot synthesis weights are related to adaptive array weights used at the transceiver to modify characteristics of the element communication signals in response to the transmitter control data.

23. The subscriber unit for receiving a communication signal from an antenna array according to claim 21 wherein the means for measuring characteristics of a plurality of different element pilots includes means for measuring a phase of a plurality of different element pilots.

24. The subscriber unit for receiving a communication signal from an antenna array according to claim 21 wherein the means for measuring characteristics of a plurality of different element pilots includes means for estimating a channel impulse response of a channel between an antenna element and the subscriber unit.

25. The subscriber unit for receiving a communication signal from an antenna array according to claim 21 further including:

means for calculating recommended adaptive array weights for modifying the plurality of element communication signals; and wherein the means for transmitting to the transceiver transmitter control data includes means for transmitting to the transceiver recommended adaptive array weights for modifying the plurality of element communication signals.

26. The subscriber unit for receiving a communication signal from an antenna array according to claim 21 wherein the means for combining the measured characteristics of the plurality of different element pilots using the pilot synthesis weights to produce a synthesized pilot includes:

means for filtering the measured characteristics of the plurality of different element pilots with the pilot synthesis weights to produce filtered results; and means for adding the filtered results to produce the synthesized pilot.

* * * * *